United States Patent
Giba et al.

(10) Patent No.: US 11,681,916 B2
(45) Date of Patent: Jun. 20, 2023

(54) COMPLEX SYSTEM FOR KNOWLEDGE LAYOUT FACILITATED ANALYTICS-BASED ACTION SELECTION

(71) Applicant: Accenture Global Solutions Limited, Dublin (IE)

(72) Inventors: Michael Thomas Giba, San Francisco, CA (US); Teresa Sheausan Tung, Tustin, CA (US); Colin Anil Puri, Walnut Creek, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 343 days.

(21) Appl. No.: 16/938,170

(22) Filed: Jul. 24, 2020

(65) Prior Publication Data

US 2021/0027158 A1    Jan. 28, 2021

Related U.S. Application Data

(60) Provisional application No. 62/877,921, filed on Jul. 24, 2019.

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC .............. G06N 3/08–088; G06N 3/04–049
See application file for complete search history.

(56) References Cited

U.S. PATENT DOCUMENTS

| | | | |
|---|---|---|---|
| 11,481,603 B1 * | 10/2022 | Newman | G06N 3/08 |
| 2010/0250477 A1 * | 9/2010 | Yadav | G06N 20/00 706/14 |
| 2019/0061147 A1 * | 2/2019 | Luciw | G06N 3/008 |
| 2019/0364154 A1 * | 11/2019 | Hermanek | H04L 51/212 |
| 2020/0394562 A1 * | 12/2020 | Nonaka | B60W 30/188 |
| 2020/0403957 A1 * | 12/2020 | Holwill Rauch | H04L 51/212 |
| 2022/0044178 A1 * | 2/2022 | Hollender | G06Q 10/06316 |

FOREIGN PATENT DOCUMENTS

CN    111033496 A  *  4/2020  ....... G06F 16/24568

* cited by examiner

*Primary Examiner* — Ying Yu Chen
(74) *Attorney, Agent, or Firm* — Crowell & Moring, L.L.P.

(57) ABSTRACT

A system maintains a knowledge layout to support the building of event and analytics models in parity. The system uses the event models to provide a snapshot of the relevant conditions present when a challenge event occurs. The system uses the analytics models to select one or more actions (which may include robotic tasks) to respond to the challenge condition. In some cases, the system may render continued response compulsory until a successful response to the challenge event is achieved.

13 Claims, 4 Drawing Sheets

US 11,681,916 B2

COMPLEX SYSTEM FOR KNOWLEDGE LAYOUT FACILITATED ANALYTICS-BASED ACTION SELECTION

PRIORITY

This application claims priority to U.S. Provisional Application No. 62/877,921 filed 24 Jul. 2019, and entitled Complex System for Knowledge Layout Facilitated Analytics-Based Action Selection, which is incorporated by reference in its entirety.

TECHNICAL FIELD

This disclosure relates to analytics model-based analysis to facilitate technical action selection and execution.

BACKGROUND

Rapid advances in electronics and communication technologies, driven by immense customer demand, have resulted in the widespread adoption of communication technology supported services. As one example, communications-based tracking and support of delivery logistics has transformed the commercial parcel delivery service marketplace. Improvements in the integration of communication-based technologies into service support will continue to increase the features and options available to service customers and providers of services.

DETAILED DESCRIPTION

The various techniques and architectures described below implement knowledge layouts (e.g., a knowledge graph, resource description framework (RDF), a labelled property graph (LPG), and/or other schematic mapping of resources) to build event and analytical models in parity as descriptors (e.g., for data, resources, analytics model templates, parties, events, or other descriptor targets) are onboarded into the knowledge layout. The event models provide a data snapshot of the conditions and available resources (including, for example, technical machine and computing resources) for response to those conditions. Analytical models may be used to select actions for response to identified sets of conditions (e.g., challenge events).

In some cases, through various data input pathways managed by input layer controlled circuitry, a system may determine a set of conditions making up a challenge event may be present. For example, a pre-defined set or dynamically identified set of conditions making up a challenge event may be detected. Based on the detection of the set of conditions, the system may determine that a challenge event is occurring. Responsive to the challenge event, the system may determine to respond (e.g., to resolve or mitigate the challenge event, or, in some case, positively feedback to amplify expected desirable outcomes associated with the challenge event). In some cases, the system may implement a compulsory condition forcing continued actions in response to the challenge event until a successful action (e.g., meeting a determined goal condition, changing the detected conditions such that the challenge event no longer applies, or other success outcome).

As discussed above, various implementations may use a knowledge layout. A knowledge layout may include a collection of nodes representing various entities, such as computing resources, human agents, assets, events, descriptors or other entities that may affect an organization. The nodes may be interconnected with edges that define relationships between the nodes.

In some implementations, a multiple-layer event resolution knowledge stack may be implemented on event resolution circuitry. The event resolution knowledge stack may include an input layer, which may handle data reception (e.g., extraction, transformation, and/or loading of data); a knowledge mapping layer, which may handle data, resource, and condition onboarding into the knowledge layout to support analytics and event model building; an analytics model layer, which may handle analytics model type selection for challenge events; a next action layer, which may handle execution of the selected analytics models to determine actions for response to challenge events; and/or a communication layer which may handle provide networking resource access for the other layers (e.g., hardware access to the communication interfaces 312 discussed below).

Figure 1:
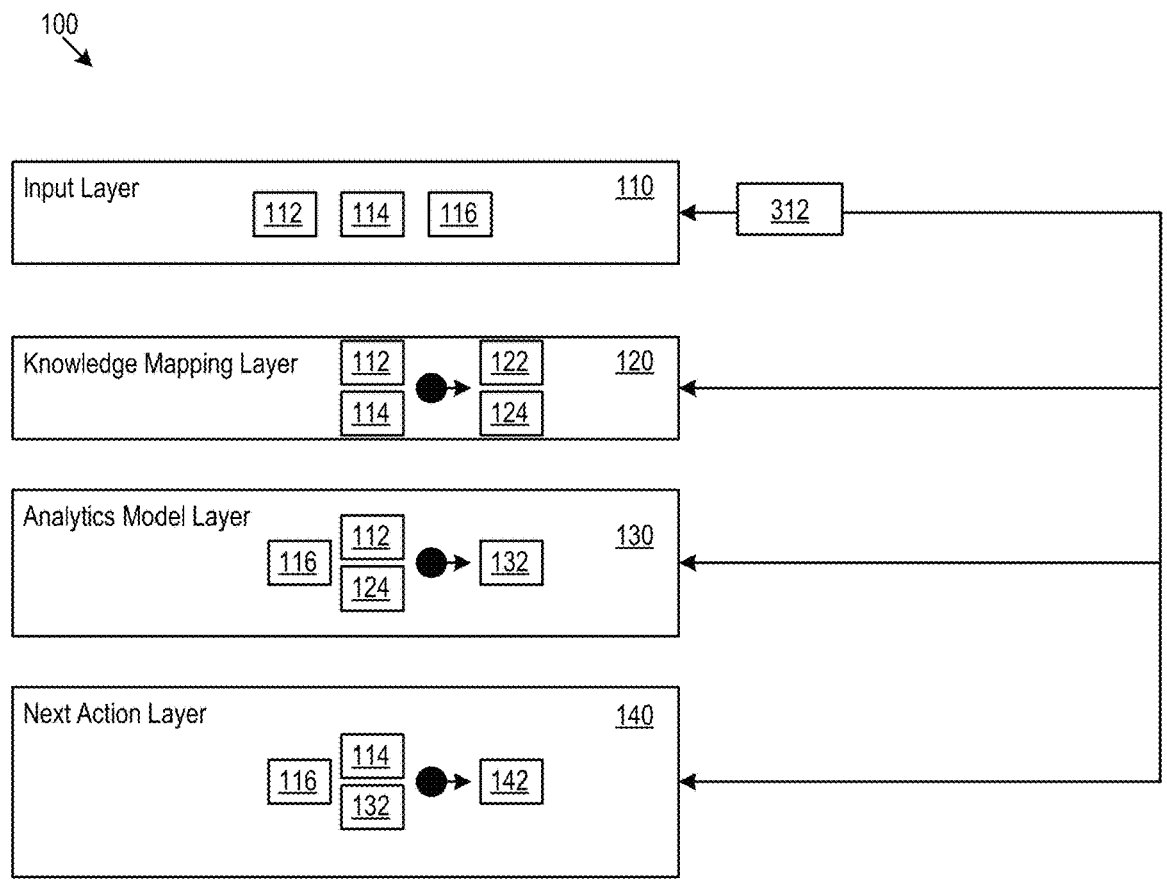
FIG. 1 shows an example event resolution knowledge stack.

Referring to FIG. 1, an example event resolution knowledge stack (ERKS) 100 is shown. The example ERKS 100 may include an input layer 110, a knowledge mapping layer 120, an analytics model layer 130, and/or a next action layer 140. The input layer 110 may handle reception of challenge event data, which may be received through network interface circuitry hardware (e.g., supplied by communication interfaces 312, discussed below). The knowledge mapping layer 120 may handle knowledge layout interactions and/or traversal. In some cases, the knowledge mapping layer may facilitate parity builds of event and analytics models through knowledge layout node interconnections. The analytics model layer 130 may select analytics models. The next action layer 140 may determine an action to execute in response to a challenge event based on resolution and analytics model data from the knowledge layout. In various implementations, a knowledge layout may be specified using an extensible markup language (XML), a yet another markup language (YAML), javascript object notation (JSON), or other scripting or markup language.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the ERKS 100, the input layer 110 may provide the knowledge mapping layer 120 with access to hardware storage resources including resolution data. Hence, the input layer 110 may provide a hardware resource, e.g., hardware storage resources, to the knowledge mapping layer 120. Accordingly, the multiple-layer stack architecture of the event resolution.

Figure 2:
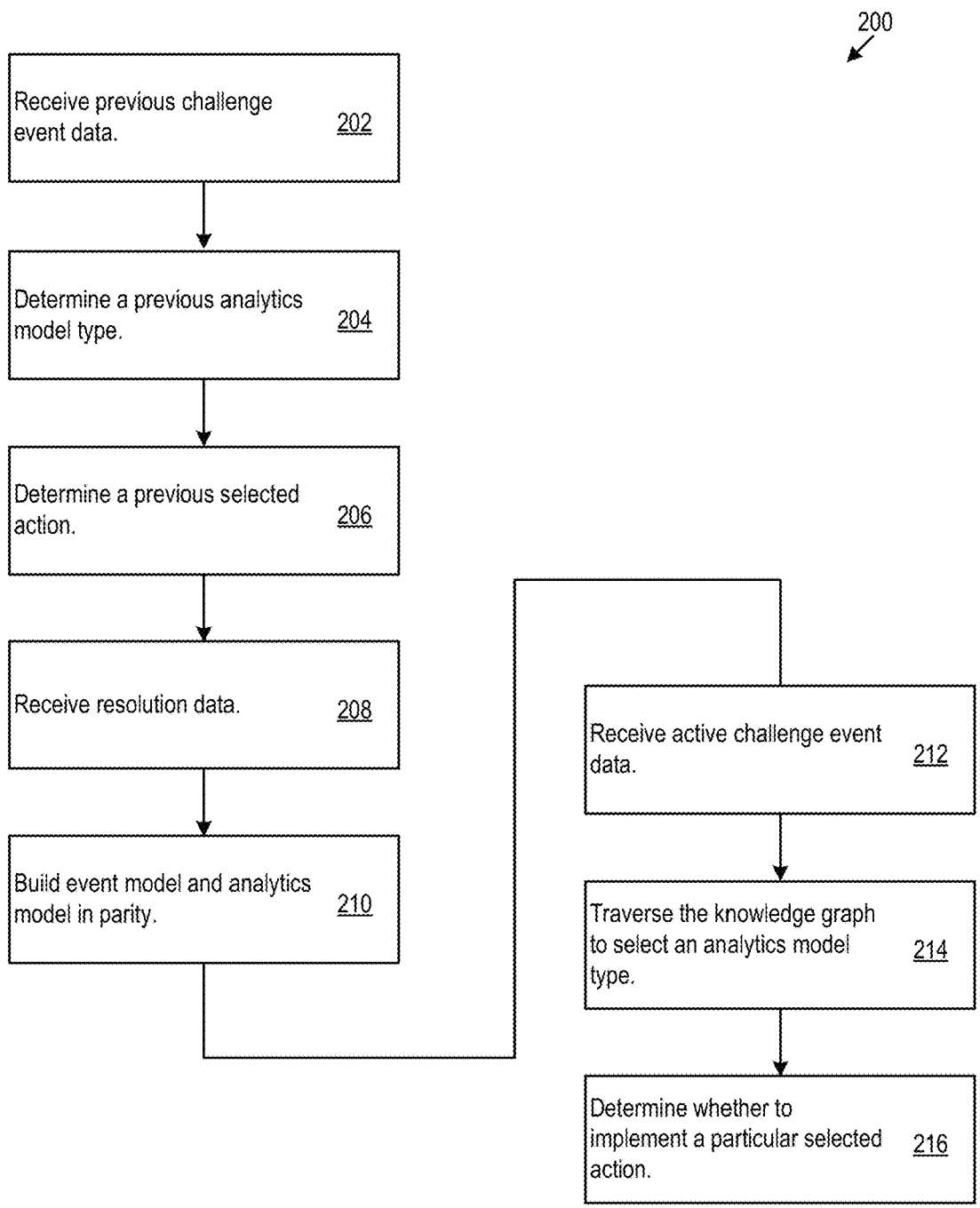
FIG. 2 shows example event resolution knowledge logic.

While continuing to refer to FIG. 1 and now referring also to FIG. 2, example event resolution knowledge logic (ERKL) 200, which may be executed by hardware to implement the layers of the ERKS 100, is shown. The ERKL 200 may, at the input layer 110, receive previous challenge event data (202). For example, previous challenge event data 112 may have been received by the ERKL 200 at the time of or after a 'previous' event that occurred sometime in the past.

That previous event challenge data may have been used to respond to the previous event. In some cases, that same previous event challenge data, along with knowledge of outcomes from the previous challenge event, can be used to determine a response to a later 'active' (e.g., current, ongoing, or otherwise more recent) event. Challenge event data may include data describing and/or identifying a challenge event. For example, challenge event data may include event names, types, severity information, consequence information, damage reports, questions posed by stakeholders, geographical information, delay information, cargo manifests, time information, details of disrupted plans, identities of affected resources and/or agents, or other data related to the challenge event.

Challenge event data may be collected and/or received via sensors, social media feeds, messaging services, news services, voice communication services, internal enterprise data systems, third-party data sources, or other data sources that may provide event information.

The ERKL 200 may determine a previous analytics model type to use for selection of an action for the previous challenge event (204). In some cases, an analytics model type 132 may be selected using the ERKS 100. For example, the ERKL 200 may use functionality at the analytics model layer 130 to select the analytics model (e.g., as discussed below with regard to the active challenge event). In some cases, the analytics model may be determined based on user input, default selections or other selection schemes, without necessarily including operation by the ERKS 100 to aid in selection.

The ERKL 200 may determine a previous selected action used to respond to the previous challenge event (206). Similarly, the previous selected action may have been selected based on operation of the ERKS 100 (as discussed below) and/or based on other decision making sources such as user input, semantic analysis such as that described in U.S. Provisional Patent Application No. 62/935,956, default response selections, or other response selections schemes.

The ERKL 200 may receive resolution data for the previous challenge event and the selected action (208). The resolution data may include data related to the status of the challenge event after application of a selected response. The resolution data may include information that may be useful in assessing the successfulness and/or appropriateness of the previous selected action in addressing the previous challenge event. The previous challenge event resolution data 114 may aid in determining whether the previous selected action should be selected again in response events that are the same as of similar to the previous challenge event. For example, the resolution data may include status information after application of the previous selected action, feedback from stakeholders, data on delays created or avoided by the previous selected action, data on costs, data on damage, or other data related to the effects and/or resulting status following the previous selected action.

The ERKL 200 may, at the knowledge mapping layer 120, onboard the previous challenge event on to a knowledge layout to guide subsequent responses to the previous challenge event and/or to other later challenge events (208). The onboarding processing may include generating nodes on the knowledge layout for the previous challenge event, the previous challenge event data 112, the analytic model type used to analyze the previous challenge event, the previous selected action, and/or the resolution data for the previous challenge event. The nodes may include pointers for data storage for information associated with each of the nodes. The nodes may include identifiers for agents or other individuals that may be affected by challenge events. The agent nodes may store contact histories for the agents with previous transactions/interactions for the agent. The agent nodes may describe aptitudes and/or skills possessed by the agents.

The ERKL 200 may build an event model 122 (e.g., a model used to describe and understand a challenge event) and an analytics model 124 (e.g., a model used to select actions in response to a particular challenge event) in parity (210) by interconnecting the nodes on the knowledge layout and detailing relationships between the nodes with the interconnects. For example, the previous selected action node and the previous challenge event node may be interconnected with an interconnect detailing that the previous selected action was implemented in response to the previous challenge event. In an example, the analytics model type node may be interconnected with the previous challenge event node (and/or previous selected action node) with an interconnect indicating that the particular type of analytics model was used to determine an action in response to the previous challenge event. The resolution data node may be interconnected with the previous challenge event node, the previous selected action node, and/or the analytics model type node, to indicate success and/or failure of various ones of these elements for later analysis.

At a time after building the event and analytics models, the ERKL 200 may receive active challenge event data 116 for an active challenge event (212). In response to the active challenge event data 116, the ERKL 200 may, at the analytics model layer 130, traverse knowledge layout to select an analytics model type 132 (214). For example, ERKL 200 may traverse knowledge layout to identify one or more previous challenge events with an analytic correspondence (for example, a semantic relationship, a structural relationship, and/or other relationship) to the active challenge event. The ERKL 200 may review analytic model selections for the previous challenge events and determine whether to implement the previous selected analytic models for the active challenge event. The selection from among previously implemented analytical models may be based on the level of analytic correspondence, the level of confidence in prediction for previous analysis, model convergence likelihood, model reliability, and/or other performance-determinative factors.

In some implementations, an analytic correspondence between different challenge events may be determined (at least in part) based on a comparison of outcomes of selected actions for the different challenge events. For example, if a first challenge event is successfully resolved by a first selected action and a second challenge event is not resolved by the same first selected action, there may be evidence of a salient difference between the first and second challenge events. Accordingly, the ERKL 200 may reduce a level of analytic correspondence between the challenge events. The ERKL 200 may determine analytic correspondence between challenge events based on the resolution/non-resolution history of the challenge events (and previous instances of the same type event). In some cases, this history may be collected by the ERKL 200, at the next action layer, by traversing the knowledge layout across multiple event nodes. In some cases, the ERKL 200 may access historical databases, social media, new sources, or other data sources to determine resolution/non-resolution history for a particular type of challenge event and/or a particular selected action.

In some implementations, the ERKL 200 may work from an existing knowledge layout rather than onboarding previous challenge actions. In some cases, the ERKS 100 may operate without implementing the knowledge mapping layer, for example.

Once a model is selected, the ERKL 200 may, at the next action layer 140, apply the resolution data 114 for a previous selected action and the active challenge event data 116 to the model to determine whether to implement a particular selected action 142 for the active challenge event (216). In some cases, multiple candidate selected actions may be evaluated using the analytics model (of the type determined at the analytics model layer). Once a selected action is determined, the ERKL 200 may initiate a robotic task associated with the selected action.

A robotic task may include an automated response that may be used to implement the selected action. As an illustrative example, the ERKL 200 may, based on active challenge event data, determine that a train may be currently operated by a non-responsive engineer. A selected action may be to bring the train to a stop at a station and order the passengers to disembark. The selected action may include multiple defined robotic tasks: (i) accessing network resources to communicate with an onboard computer on the train, (ii) accessing sensor to determine distance to the nearest station, (iii) issuing commands to the computer on the train to cause the train to deploy braking as it arrives in the station, (iv) issuing commands to cause doors to open, and/or other robotic tasks.

In various scenarios, robotic tasks may include making a hotel reservation, scheduling repairs to a machine, optionally including software repairs, initiating a currency, credit, or tokenized transaction, activating an actuator, activating a light emitting diode (LED) or other light source, applying brakes in a vehicle, a system model deployment, an enterprise-internal system invocation, a third-party service invocation, requesting emergency support, and/or other real world response.

In some cases, after determination to implement selected action, the ERKL 200 may determine to onboard resource mappings on to the knowledge layout to support execution of one or more robotic tasks. In some cases, onboarding may include generating nodes on the knowledge layout representing communication and/or processing resources used to control or communicate with systems performing robotic tasks. In some cases, the addition of nodes to the knowledge layout to onboard robotic task functionality may be accomplished through the incorporation of a preset extension to the knowledge layout. For example, the layout structure for the robotic task functionality may be stored within data defining the selected task.

Figure 3:
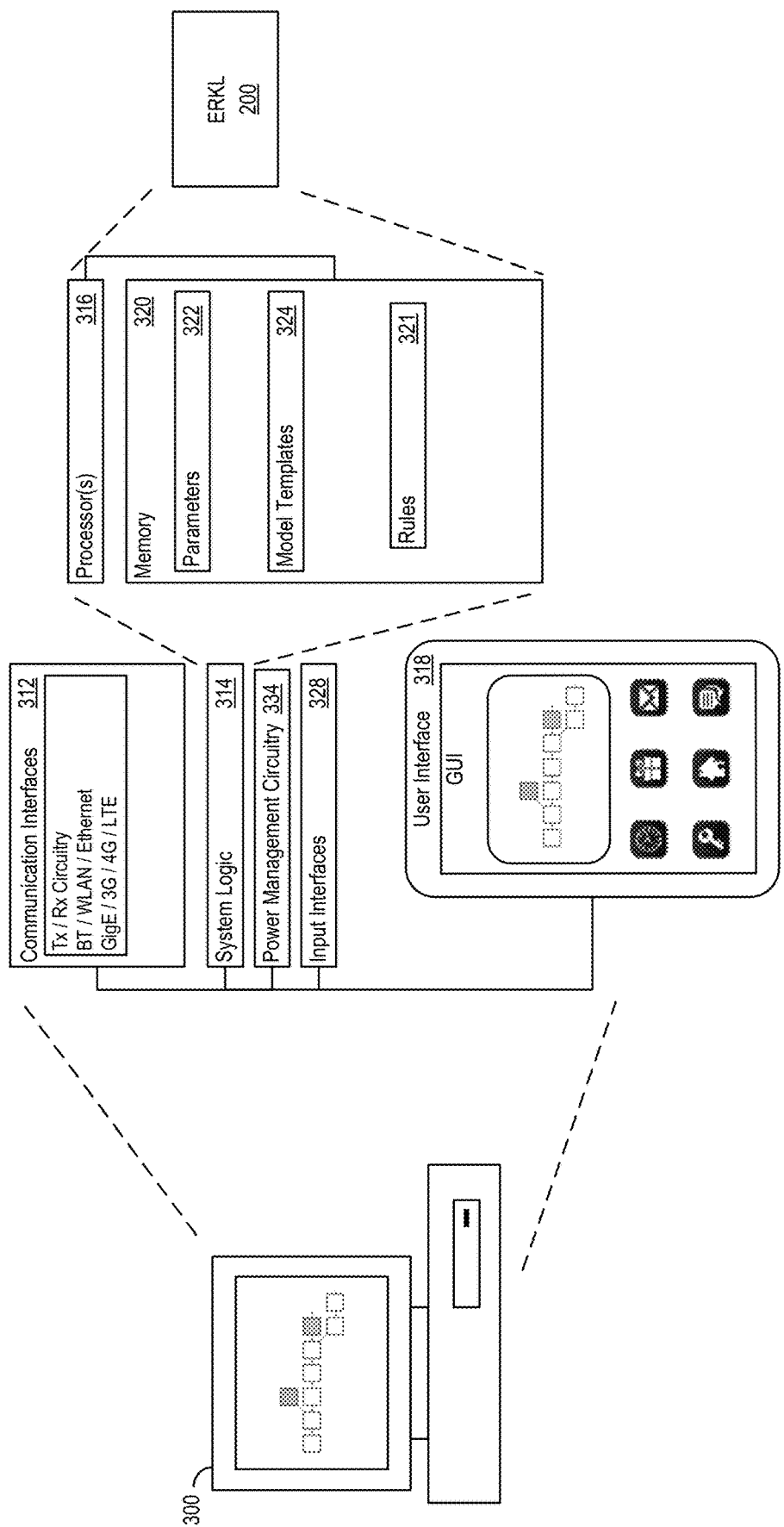
FIG. 3 shows an example execution environment for a for an event resolution knowledge stack.

FIG. 3 shows an example execution environment (EE) 300 for implementing the event resolution knowledge stack. The EE 300 may include system logic 314 to support tasks described in the disclosure, including the drawings and/or claims. The system logic 314 may include processors 316, memory 320, and/or other circuitry, which may be used to implement the event resolution knowledge logic 200, which may provide software support to implement the various tasks performed by the event resolution knowledge stack.

The memory 320 may be used to store parameters 322 and/or model templates 324 used in the analytics models. The memory 320 may further store selection rules 321, that may facilitate selection of actions and/or analytics models.

The memory 320 may further include applications and structures, for example, coded objects, templates, or one or more other data structures to support action selection and challenge event response. The EE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the communication layer as network interface circuitry, with data sources or resources used to invoke selected action or other parties to facilitate operation of the event resolution knowledge stack. Additionally or alternatively, the communication interface 312 may support secure information exchanges, such as secure socket layer (SSL) or public-key encryption-based protocols for sending and receiving private data. The EE 300 may include power management circuitry 334 and one or more input interfaces 328.

The EE 300 may also include a user interface 318 that may include man-machine interfaces and/or graphical user interfaces (GUI). The GUI may be used to present interfaces and/or options to operators involved in actions responding to challenge events.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Example Implementation

Figure 4:
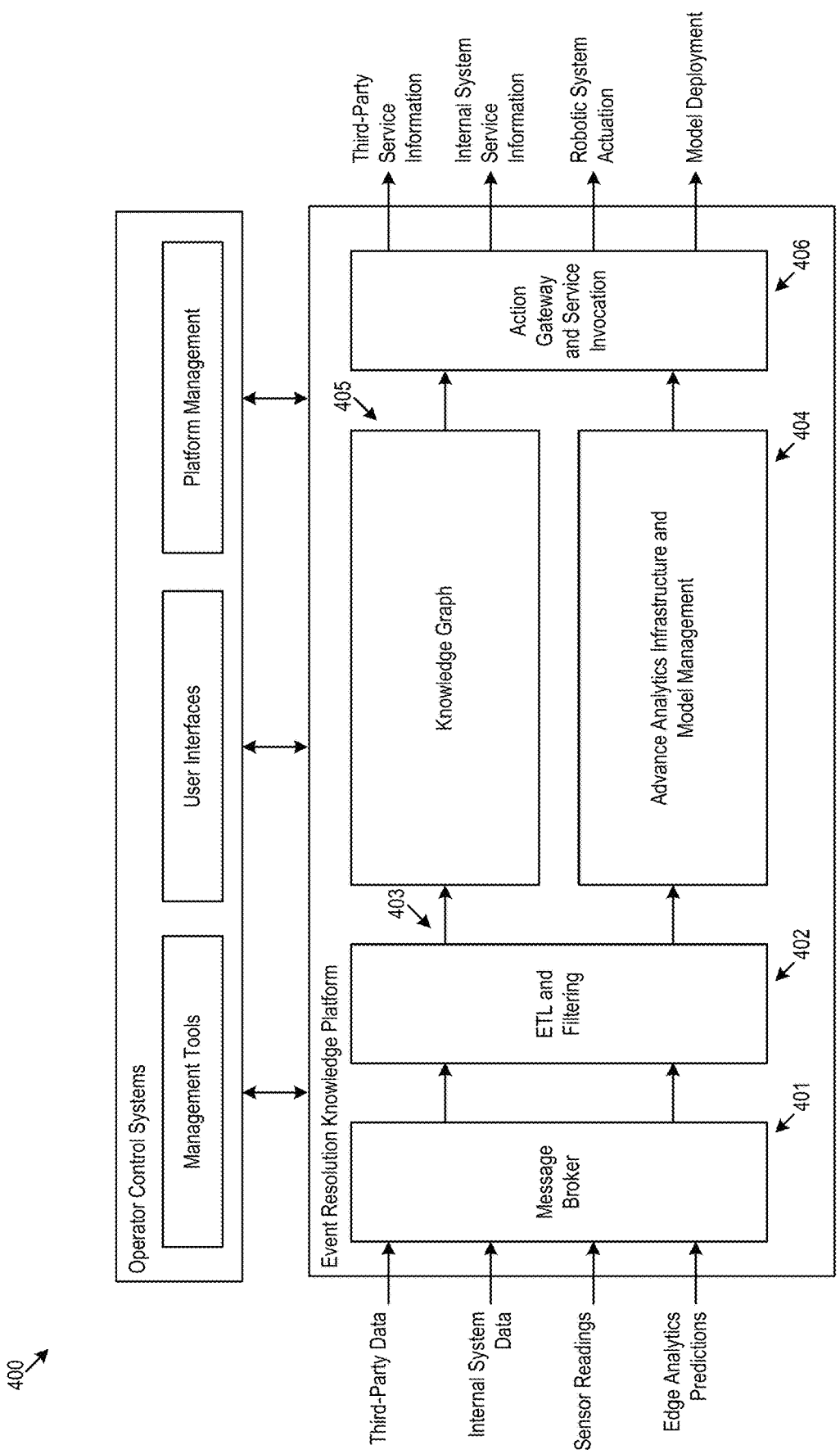
FIG. 4 shows an example processing architecture.

FIG. 4 shows an example processing architecture 400 that may implement the ERKS 100. Data from various sources is streamed and ingested into the processing architecture (401), via a message broker. Services extract, transfer and load (ETL) information (402) from the data into the knowledge graph (403). In some cases, these ETL processes can employ advanced analytics running on model management infrastructure in the system. In example, the message broker and ETL functions may controlled via the input layer 110. The onboarding of the incoming data on to the knowledge graph may be handled by the knowledge mapping layer 120. When a challenge event within a predefined & actionable process has been detected from the data streaming in, an analytics model can be deployed (404) to the model management infrastructure to determine the appropriate actions to take by reading from the knowledge graph and processing the information (405). This selection of the analytics model may be handled by the analytics model layer 130. The results of the model determine a selected action which may be taken by the system (406). In some cases, selection of an action may trigger external service calls and/or insertions into the knowledge graph to support execution of the action. The selection and implementation of the action may be handled by the next action layer 140.

Various implementations have been specifically described. However, many other implementations are also possible.

Headings and/or subheadings used herein are intended only to aid the reader with understanding described implementations.

What is claimed is:

1. A method including:
   at an input layer of an event resolution knowledge stack receiving previous challenge data associated with a previous challenge event:
      determining a used analytics model type from among multiple available analytics model types for selection of an action for the previous challenge event;
      determining a previous selected action for the previous challenge event, the previous selected action selected using a used analytics model type;
      receiving resolution data responsive to execution of the previous selected action;
   at knowledge mapping layer of the event resolution knowledge stack:
      onboarding the previous challenge event to a knowledge layout by generating nodes on the knowledge layout, the knowledge layout comprising a collection of interconnected nodes representing mapping of resources, the nodes including:
         a previous challenge event node to represent the previous challenge event;
         a used analytics model type node to represent to the used analytics model type;
         a previous selected action node to represent previous selected action; and
         a resolution data node to represent the resolution data, wherein the nodes comprise pointers for data storage for information associated with each of the nodes;
      building event and analytics models in parity by:
         interconnecting the previous selected action node with the previous challenge event node on the knowledge layout;
         interconnecting the used analytics model type node with the previous challenge event node; and
         interconnecting the resolution data node with the previous challenge event node;
   at the input layer, receiving active event data associated with an active challenge event;
   at an analytics model layer of the event resolution knowledge stack:
      traversing the knowledge layout to select an analytics model type by:
         based on the active event data and the previous challenge data, determining an analytic correspondence between the active challenge event and the previous challenge event;
         based on the analytic correspondence determining to implement the used analytics model type for selection of an action for the active challenge event; and
   at a next action layer of the event resolution knowledge stack:
      traversing the knowledge layout to implement a selected action by:
         applying the resolution data to an analytics model of the used analytics model type to determine whether to implement the previous selected action for the active challenge event; and
         when the previous selected action is determined to be implemented, controlling, with a processing resource, execution of a robotic task defined within the previous selected action, the robotic task representing automated command configured to implement the selected action;
      generating a processing resource node representing the processing resource and adding the processing resource node to the knowledge layout.

2. The method of claim 1, after applying the previous selected action, determining whether a difference in outcome between the previous and active challenge events is present.

3. The method of claim 2, when a difference is present, adjusting the analytic correspondence between the previous and active challenge events based on the difference.

4. The method of claim 1, where the resolution data indicates success or failure of the previous selected action after implementation of the previous selected action.

5. The method of claim 1, further including, at the next action layer, traversing the knowledge layout across multiple challenge events to determine a resolution history for the previous selected action.

6. The method of claim 1, further including identifying the active challenge event through reception of an active challenge event data at an input layer of the event resolution knowledge stack.

7. The method of claim 6, further including performing, at the input layer, data extraction, data transformation, data loading or any combination thereof from a data source.

8. The method of claim 7, where the data source includes an internet of things (IoT) sensor, a social media feed, a messaging service, or any combination thereof.

9. The method of claim 1, where the knowledge layout includes a resource description framework (RDF), a labelled property graph (LPG), or both.

10. The method of claim 1, where the knowledge layout is specified in an extensible markup language (XML), a yet another markup language (YAML), a javascript object notation (JSON), or any combination thereof.

11. A product including:
machine-readable media other than a transitory signal; and
instructions stored on the machine-readable media, the instructions configured to, when executed, cause a machine to:
at an input layer of an event resolution knowledge stack receiving previous challenge data associated with a previous challenge event:
determine a used analytics model type from among multiple available analytics model types for selection of an action for the previous challenge event;
determine a previous selected action for the previous challenge event, the previous selected action selected using a used analytics model type;
receive resolution data responsive to execution of the previous selected action;
at knowledge mapping layer of the event resolution knowledge stack:
onboard the previous challenge event to a knowledge layout by generating nodes on the knowledge layout, the knowledge layout comprising a collection of interconnected nodes representing mapping of resources, the nodes including:
a previous challenge event node to represent the previous challenge event;
a used analytics model type node to represent to the used analytics model type;
a previous selected action node to represent previous selected action; and
a resolution data node to represent the resolution data, wherein the nodes comprise pointers for data storage for information associated with each of the nodes;
build event and analytics models in parity by:
interconnecting the previous selected action node with the previous challenge event node on the knowledge layout;
interconnecting the used analytics model type node with the previous challenge event node; and
interconnecting the resolution data node with the previous challenge event node;
at the input layer, receiving active event data associated with an active challenge event;
at an analytics model layer of the event resolution knowledge stack:
traverse the knowledge layout to select an analytics model type by:
based on the active event data and the previous challenge data, determining an analytic correspondence between the active challenge event and the previous challenge event;
based on the analytic correspondence determining to implement the used analytics model type for selection of an action for the active challenge event; and
at a next action layer of the event resolution knowledge stack:
traverse the knowledge layout to implement a selected action by:
applying the resolution data to an analytics model of the used analytics model type to determine whether to implement the previous selected action for the active challenge event; and
when the previous selected action is determined to be implemented, controlling, with a processing resource, execution of a robotic task defined within the previous selected action, the robotic task representing automated command configured to implement the selected action;
generate a processing resource node representing the processing resource and add the processing resource node to the knowledge layout.

12. The product of claim 11, where instructions are further configured to cause the machine to identify the active challenge event through reception of the active challenge event data at an input layer of the event resolution knowledge stack.

13. The product of claim 12, where instructions are further configured to cause the machine to perform, at the input layer, data extraction, data transformation, data loading or any combination thereof from a data source.

* * * * *